A. J. BUCH.
DEVICE FOR FORMING BOX TOES ON SHOES.
APPLICATION FILED JULY 12, 1910.

1,157,481. Patented Oct. 19, 1915.
2 SHEETS—SHEET 1.

A. J. BUCH.
DEVICE FOR FORMING BOX TOES ON SHOES.
APPLICATION FILED JULY 12, 1910.

1,157,481.

Patented Oct. 19, 1915.
2 SHEETS—SHEET 2.

Witnesses:

Inventor:
Adam J. Buch,
By
Attorney.

UNITED STATES PATENT OFFICE.

ADAM J. BUCH, OF PORTSMOUTH, OHIO, ASSIGNOR, BY MESNE ASSIGNMENTS, TO SAVODAY RACK COMPANY, OF ST. LOUIS, MISSOURI, A CORPORATION OF MISSOURI.

DEVICE FOR FORMING BOX-TOES ON SHOES.

1,157,481.      Specification of Letters Patent.      Patented Oct. 19, 1915.

Application filed July 12, 1910. Serial No. 571,605.

*To all whom it may concern:*

Be it known that I, ADAM J. BUCH, a citizen of the United States, residing at Portsmouth, in the county of Scioto and State of Ohio, have invented certain new and useful Improvements in Devices for Forming Box-Toes on Shoes, of which the following is a specification.

This invention relates to heating or drying apparatus for use in the manufacture of boots and shoes and will be herein disclosed as embodied in an apparatus designed particularly for heating or drying the toe portions of shoes. Apparatus of this general character has been used to a limited extent heretofore for the purpose of drying and hardening the box toes of McKay shoes before the last is pulled out of the shoe preparatory to securing the outsole thereto and for baking the toe portions of patent leather shoes to dry the enamel or lacquer that is used in repairing the tips of shoes made from this kind of stock.

The present invention has for its main object to improve the efficiency of devices of this character, to increase the capacity of such devices in proportion to the space that they occupy, and to decrease the manufacturing cost of such devices. The manner in which it is proposed to accomplish these objects will be clearly understood from the following description, reference being made to the accompanying drawings, in which—

Figure 1:
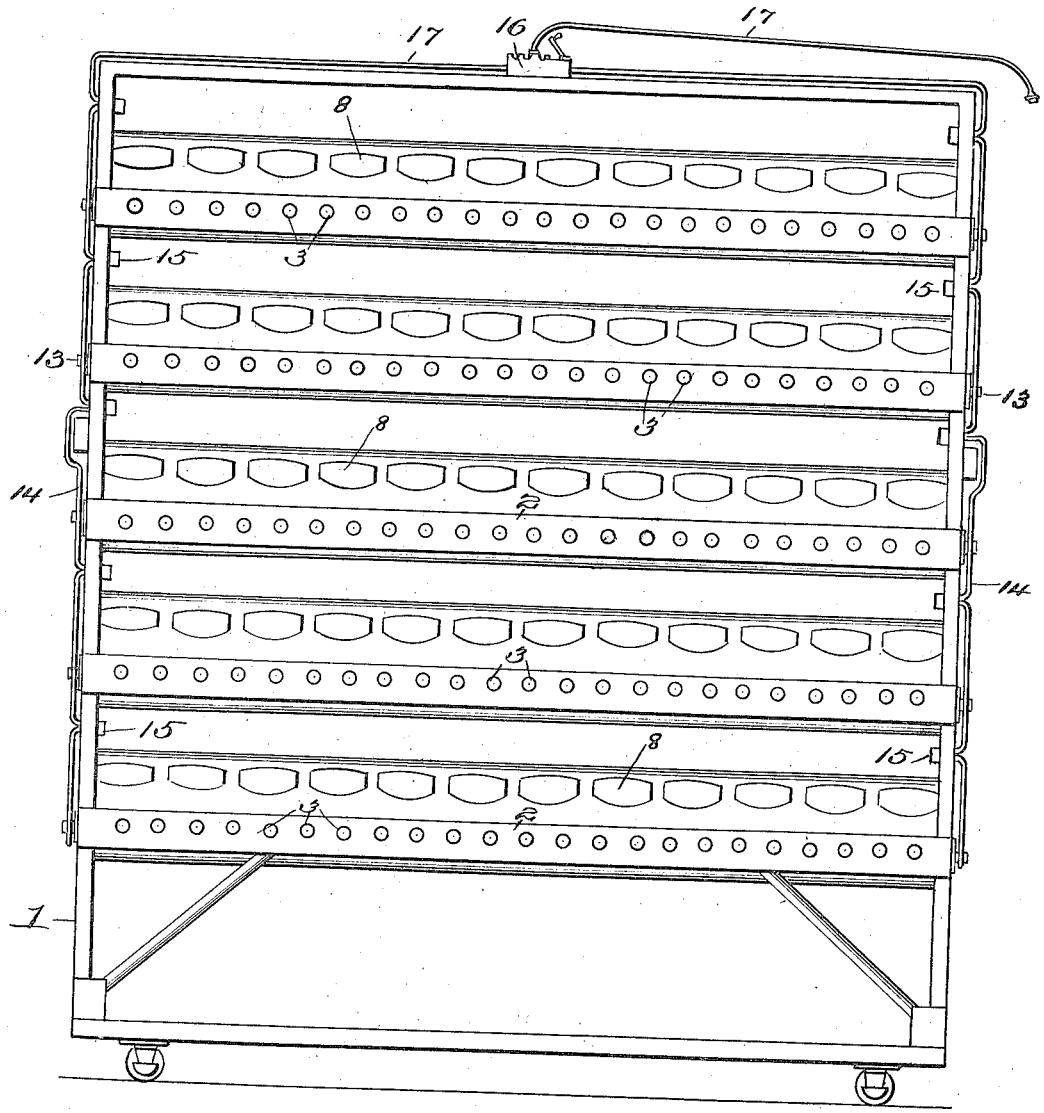
Figures 2, 3, 4:
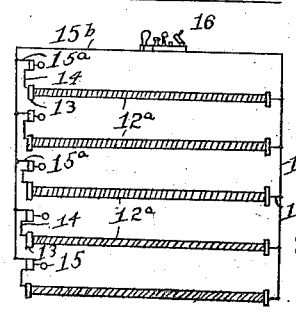

Figure 1 is a view in side elevation of a shoe drying rack embodying the invention; Fig. 2 is a vertical cross sectional view through the rack shown in Fig. 1; Fig. 3 is an end elevation of the rack shown in Fig. 1; and Fig. 4 is a diagrammatic view showing one arrangement of connections for the heating units that are employed in the apparatus.

The apparatus shown is constructed in the form of a rack broadly similar to the racks employed in shoe factories for holding the shoes while they are being transported from one part of the factory to another, and comprises a pair of upright end supports 1 mounted on a suitable base and carrying a vertical series of pairs of bars 2. Each bar has projecting therefrom a series of outstanding pins 3, the pins being arranged in pairs and each pair being adapted to support a shoe between them in an inverted position. As shown in Fig. 2, the pins carried by each pair of bars project in opposite directions so that they support the shoes on opposite sides of the rack with their toes extending toward each other and toward the middle of the rack.

Each pair of bars 2 has resting thereon the bottom 4 of a casing 5 which extends the entire length of the rack and is provided with a flat top member 6 and side walls supporting it from the bottom 4. Preferably, a lining 7 of heat insulating material, such for instance as asbestos, is provided for the interior of the casing. A series of apertures 8 is formed in the opposite side walls of the casing 5, each aperture being shaped to receive the toe portion of a shoe when supported on one of the pairs of pins 3. The bottom of each casing is depressed to form a recess in which is mounted a heating medium or unit 12. This medium may be of any suitable character but preferably is an electrically heated member. The construction shown for purposes of explanation is of a usual type consisting of a core having a resistance wire $12^a$ wound thereon. Current is carried to these units through suitable conductors 17 connected to a main switch 16; one wire $16^a$ extending from this switch being connected by short leads $13^a$ to one terminal of each of the units 12, while the other wire $15^b$, leading from the switch 16, is connected to the opposite ends of the units 12, each of these last connections being made through a lead $15^a$, switch 15 and a short wire or lead 14 that connects the switch with the terminal 13 of the unit. In other words, the units are connected in multiple in a main circuit controlled by the switch 16 and the current through each unit is further controlled by the switch 15. By this arrangement any desired number of the units may be heated at one time and any combination desired may be obtained. Air admission openings 10 are formed through the bottom 4 of each casing below the unit 12.

In using the apparatus the shoes are placed on the oppositely arranged shoe supports with their toes extending toward each other and projecting through the apertures 8 into the respective casings 5, as indicated in dotted lines at the bottom of Fig. 2. The lining 7 of each casing preferably is extended to the edges of the opening 8 so that it will protect the shoe from abrasion.

Assuming the current to be turned on to the units 12, the air around each unit will be heated and will be directed by the surrounding casing on to the toes of the shoes projecting into it. It should be noted that the resistance unit 12 is located in the casing at a level below the level of the shoes projecting into the casing. This arrangement is preferred since it causes the current of air, flowing slowly through the holes 10 in the floor of the casing and becoming heated by the unit 12, to rise and circulate around the toe portions of the shoes before passing out of the toe receiving openings 8. Obviously, also, this arrangement brings the toes of the shoes into the hottest portion of the casing. The casing, of course, protects the parts of the shoes other than the toe portions from becoming heated to any substantial extent by the heat radiated from the heating medium 12.

Having thus described the invention, what is claimed as new and desired to be secured by Letters Patent of the United States is:—

1. An apparatus for drying shoes, comprising a heating medium adapted to continuously maintain heat of a temperature sufficient to dry out the toe portions of shoes, shoe supports oppositely arranged with reference to said medium and constructed to support shoes with their toes extending toward each other into position to be heated by said medium, and means forming a part of said apparatus for protecting the parts of the shoes other than the toe portions from the heat radiated by said heating medium.

2. An apparatus for drying shoes, comprising a heating medium, shoe supports oppositely arranged with reference to said medium and constructed to support shoes with their toes extending toward each other, and a casing arranged to inclose the toe portions of the shoes constructed and arranged to confine the application of air heated by said medium to the toe portions only of the shoes sustained by said supports.

3. An apparatus of the character described, comprising a casing having apertures in its opposite side walls shaped to receive the toe portions only of shoes, shoe supporting means positioned adjacent to said apertures, and means for heating the interior of said casing.

4. An apparatus of the character described, comprising an elongated casing having apertures in its opposite side walls shaped to receive the toe portions only of shoes, shoe supporting means arranged to sustain shoes with their toes in said apertures, and a heating medium in said casing below the level at which the toe portions of the shoes project therein.

5. A rack for drying the toe portions of shoes, comprising an elongated casing having a series of openings in each of its opposite side walls for the reception of the toe portions only of shoes, shoe supports positioned adjacent to said series of openings and constructed to sustain the shoes with their toes in said openings, and a heating medium in said casing.

6. A rack for drying the toe portions of shoes, comprising an elongated casing having a series of openings in each of its opposite walls for the reception of the toe portions only of shoes, shoe supports positioned adjacent to said series of openings and constructed to sustain the shoes with their toes in said openings, and a heating medium in said casing, the bottom of said casing being depressed to provide a recess in which said heating medium is located at a level below the toe receiving apertures.

7. An apparatus of the character described, comprising an elongated casing, a heating medium extending longitudinally of said casing, and shoe supports oppositely arranged with reference to said medium and constructed to support shoes with their toes extending toward said medium into position to be heated thereby, said casing being constructed to confine the application of the air heated by said medium to the toe portions only of the shoes sustained by said supports.

In testimony whereof I affix my signature in presence of two witnesses.

ADAM J. BUCH.

Witnesses:
WILLIAM L. QUESTEL,
JOHN R. HUGHES.